March 3, 1959  F. BELLISARIO  2,876,034
PICK-UP AND TRANSFER DEVICE
Filed May 31, 1956  2 Sheets-Sheet 1
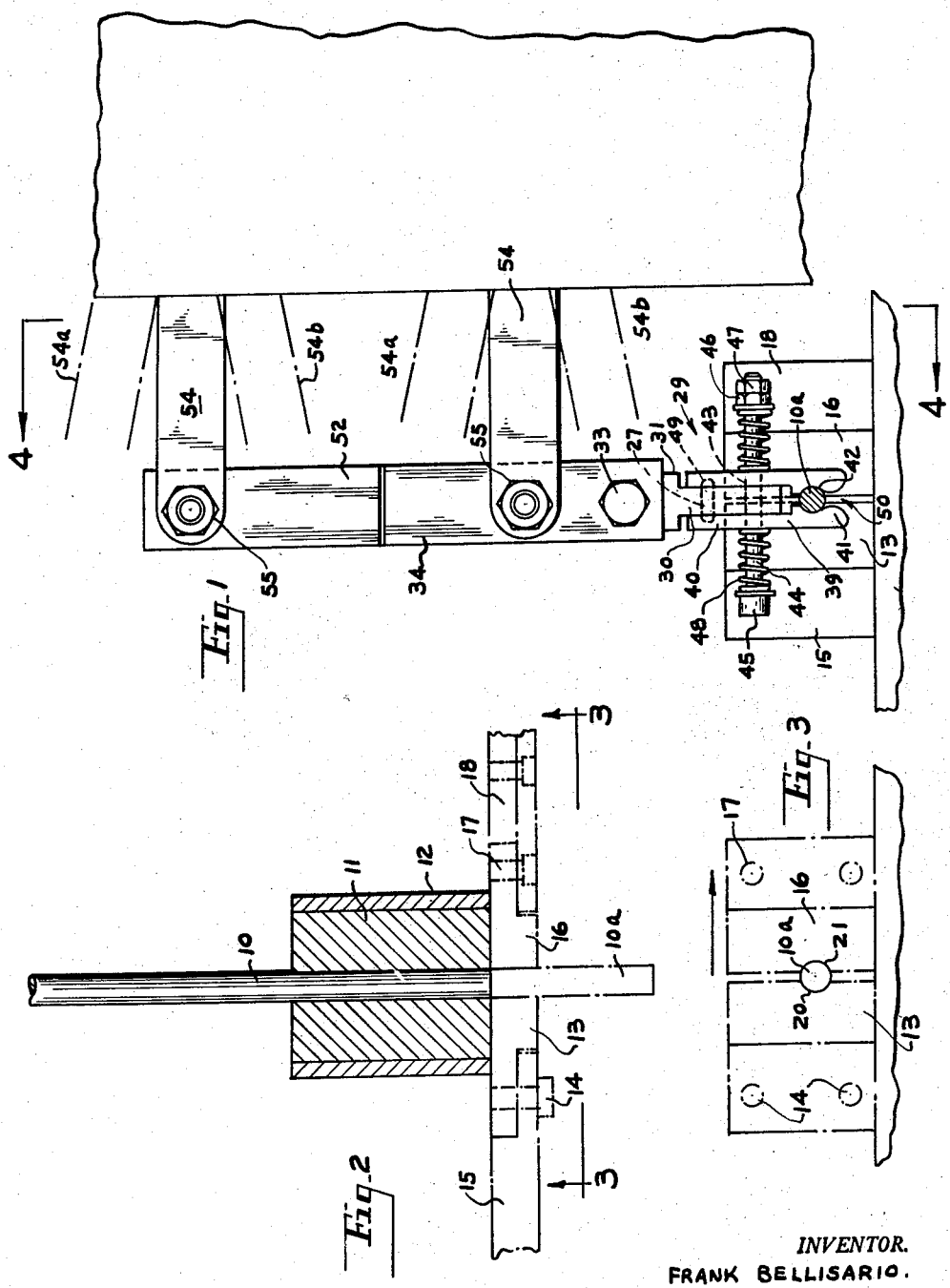
INVENTOR.
FRANK BELLISARIO.
BY
ATTORNEY March 3, 1959
F. BELLISARIO
2,876,034
PICK-UP AND TRANSFER DEVICE
Filed May 31, 1956
2 Sheets-Sheet 2
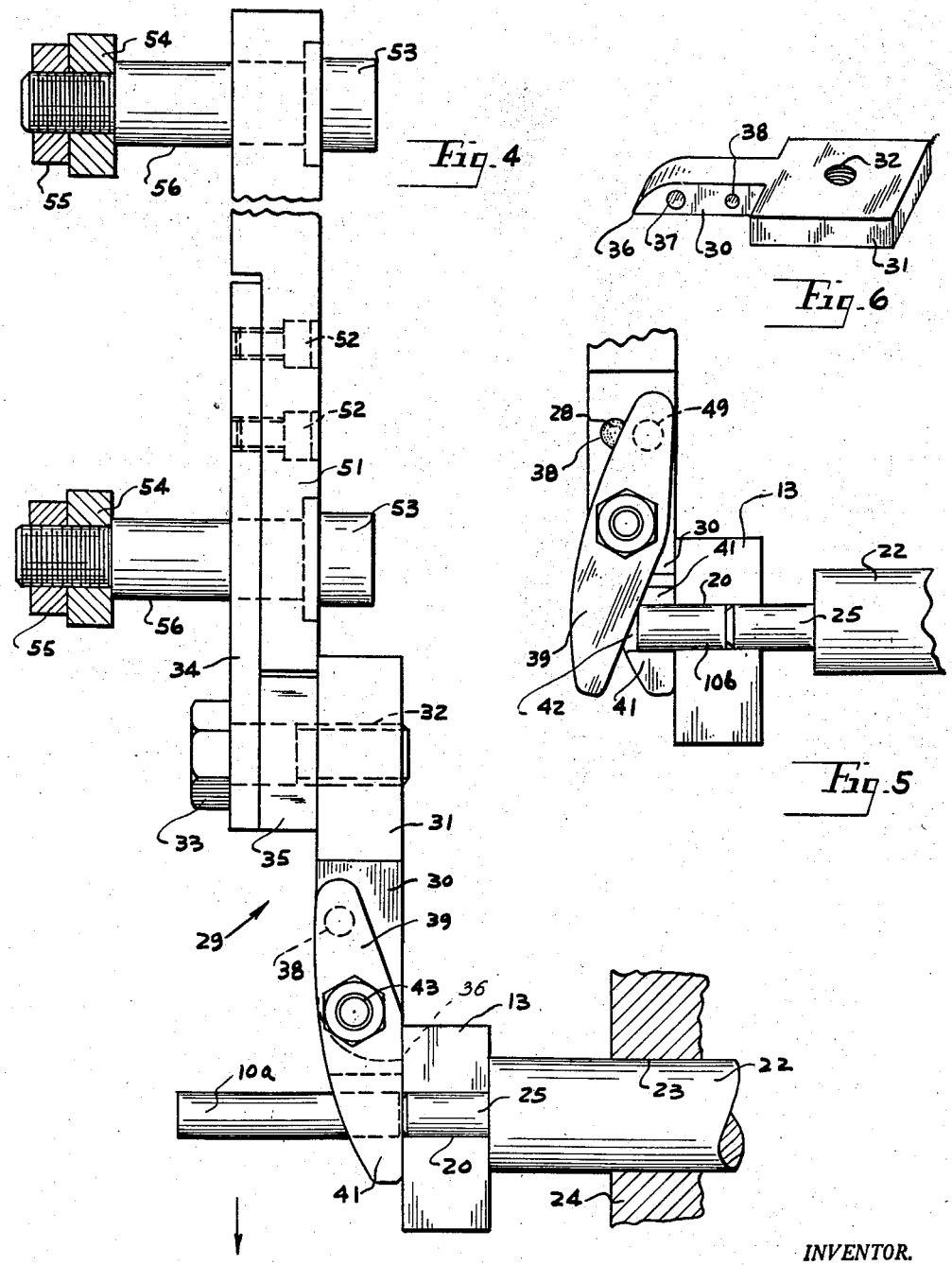
INVENTOR.
FRANK BELLISARIO.
BY Louis Chayka
ATTORNEY United States Patent Office 2,876,034
Patented Mar. 3, 1959

2,876,034

PICK-UP AND TRANSFER DEVICE

Frank Bellisario, East Detroit, Mich., assignor to Waterbury Farrell Foundry and Machine Co., Waterbury, Conn., a corporation Application May 31, 1956, Serial No. 588,272

4 Claims. (Cl. 294—106)

This pick-up and transfer device is intended for use in a machine in which a blank will be picked up at one location and transferred to another location for consecutive operative actions thereon.

The object of my improvement is to provide a device which will be simple in structure but fully practical and reliable in operation. Another object of the improvement is to provide a device which will seize and transfer to another location a blank of a normal length, but which will not pick up a blank of a shorter length, permitting said blank to drop out as a defective unit.

More specifically, my device is directed for use with a machine which will cut off a length of a wire forming a blank and in which my device will pick up said blank and carry it to a heading die for the purpose of having a head shaped at one end of the blank.

I wish to state that pick-up devices for the purpose of transferring a blank from one position to another in a particular machine are already in use and that my invention is directed to the pick-up device alone. Because of that, only such parts of a machine which includes a pick-up and transfer device are named in the specification as are needed for the understanding of the working of said device.

I shall now describe my improvement with reference to the accompanying drawings in which:

Fig. 1 is a front view of my pick-up device, the view including a link upon which the device is mounted and a pair of parallel levers which actuate the link;

Fig. 2 is a sectional view of a cut-off die through which wire stock is fed, the view including cutting elements serving to cut off lengths of said wire;

Fig. 3 is a view of the cutting elements as seen from line 3—3 in Fig. 2;

Fig. 4 is an enlarged side elevational view of the pick-up device as mounted upon said link;

Fig. 5 is a side elevational view of the pick-up device in which one element is in a position different than shown in Fig. 4;

Fig. 6 is a perspective view of a part of the pick-up device.

Similar numerals refer to similar parts throughout the several views.

I will first refer to the drawing in Fig. 2 which shows a length of wire 10 as the wire is fed towards a pair of cutters through a die 11. The latter is ordinarily composed of two complementary parts held together in a cylindrical bushing 12. The cutters are located at the outlet end of the die 11, one of said cutters, marked 13, being secured by means of screws 14, to a slide marked 15. A co-operating member, known as a gripping cutter 16, is similarly secured by screws 17 to a return slide 18.

It will be noted that the cutter 13 is provided with an arcuate recess 20 in the side facing the gripping cutter 16 which is similarly provided with an arcuate recess 21. The two recesses define a part of a circular space of a diameter corresponding to the diameter of the wire which is to fit into said space.

It will be understood that the slides 15 and 18 are connected to other elements of the respective machine, by which elements slide 15, with the cutter 13, will be pushed laterally against the wire protruding from the die 11, and that the cutter 13 and the gripping cutter 16 will carry the cut-off piece or blank past the die 11 to a position where the blank will be pushed out from between said two cutters.

This is illustrated in Figs. 1 and 3, Fig. 3 showing the cutters and a blank 10a held therebtween, while the same cutters are shown in Fig. 1 with the cut-off blank in a position where the blank is to be pushed out from between said cutters. I wish to add that the two cutters, as carried by slides 15 and 18, are adapted to move in a straight line from the cut-off die 11 towards the push-out device to which I shall now refer.

The push-out device is a part of the same machine which operates the cutters, and includes, as an operating element, a rod 22 which is slidingly disposed in a bore 23 in a supporting element 24. The rod terminates at its operative end with a push-pin 25 which is of a sufficiently small diameter to fit into the space between the arcuate recesses in the two cutters.

The pick-up device, generally identified by numeral 29, includes a bar 30 which at one end includes a laterally-expanded shank 31. The shank is provided with a threaded bore 32 for application of a bolt 33. It is by means of said bolt that the shank is connected to a safety plate 34. A square block 35, having an aperture which is alined with said bore 32, acts as a spacer between the shank and said safety plate 34 to which I shall presently refer again.

The end of the bar 30 remote from the shank tapers to an edge 36. It is at this end that said bar contains a lateral bore 37, while another bore 38 is located within the bar close to the shank. Located within said bore 38 is a pin 27, each end 28 thereof being semi-spherical in shape, well polished, and protruding on each side of the bar beyond the surface thereof.

Straddling the bar 30 are two fingers 39. Each includes a long, flat arm 40 having at one end, which will be called the operative end, a lateral pad 41, said pad being provided with an arcuate recess 42. Intermediate its ends each finger is provided with an aperture 43 for application of a rod 44 which passes through the bore 37 in the bar 30 and through aperture 43 in each finger 39. At one end the rod includes a head 45, while the other end of it carries two nuts, 46 and 47, which are threaded thereon. Coiled about the rod, between one finger 39 and the head 45 of the rod, is a coiled spring 48. A similar spring is coiled about the rod between the opposite finger and the two nuts, the object of this construction being to hold the fingers in a yielding abutment with the sides of the bar 30. Between the aperture 43 and that end of the finger which extends towards the shank 31, each arm contains a lens-shaped cavity 49 for engagement with one of the polished ends 28 of pin 27.

It will be noted, on reference to Fig. 1, that the operative ends of fingers 39, specifically, the portions including pads 41, extend beyond the end of the bar 30, and that the outer ends of the pads 41 are drawn to a radius so as to leave therebetween a funnel-shaped space marked 50.

Returning now to the safety plate 34, it will be noted that the latter is supported by means of bolts 52 which, in turn, are secured to two parallel levers 54. Numeral 55 indicates nuts applied to the ends of said bols. Numeral 56 indicates bushings upon said bolts 52.

It will be understood that the levers are operated by suitable mechanism of the machine in such a manner that both said levers will swing up and down simultaneously, each from a pivotal connection within supporting members within said machine. Successive positions of said levers in the course of their operation are shown in dotted lines 54a, which lines show the levers in their uppermost positions, and in dotted line 54b which show the levers in their lowermost positions. Since my pick-up device is connected by intermediate means to said levers, it follows that said device will be carried through said consecutive stages, namely, from a position above the cutters to a position opposite the cutters and, finally, in continuation of this movement, to a position below said cutters.

The device operates as follows:

After the cutters 13 and 16 have moved a blank 10a to a position in front of the push-out pin 25, the pin will move into the space defined by arcuate recesses 20 and 21 between said cutters, and will travel through said space to the end thereof, pushing out the blank. Before this pushing-out of the blank has been completed, the pick-up device will be brought down by the levers 54, the fingers 39 will engage the blank from the diametrically-opposed sides, as shown in Fig. 1, during which process said fingers will be first spread apart against the tension of coiled springs 48.

However, if the blank should be very short, the fingers of the pick-up device will be in front of the cutters before the pin 25 has travelled far enough to push out said short blank. The result is that the fingers 39 have nothing to grab, but that they will be in the path of the movement of the short blank when it finally is pushed out from between the cutters. When so pushed out, the blank will hit one or both fingers, with the result that the lower portion of at least one of said fingers will be swung outwardly from the position shown in Fig. 4 to the position shown in Fig. 5. As shown in said Fig. 5, the finger so hit will swing out of alinement with the other finger so that both will be in an open, scissor-like relation with one pad 41 out of alinement with the other pad, causing the blank to drop down.

In the course of the continued movement of the pick-up device to its next position for delivery of the blank to the heading die, a member which is adapted to knock out the blank from between the fingers 39 will hit the finger from its non-grabbing position, shown in Fig. 5, back to its initial position shown in Fig. 4.

As the member of the machine which is so adapted to knock out the blank from the pick-up device is already a part of a machine now in common use, no description thereof appears to be necessary.

After having described my improvement, what I wish to claim is as follows:

1. A pick-up forming a part of a transfer device comprising a bar defined by two parallel sides, the bar including, at one end, a shank, and being provided with a lateral bore at the other end and with another lateral bore adjoining the shank, a rod disposed within the first-named bore and extending at each end outwardly of said bar, a pin disposed within the second-named bore and terminating, at each end, with a semi-spherical tip projecting above the side surface of the bar, two fingers straddling said bar, each finger including an oblong arm pivotally mounted, intermediate its length, on said rod and extending beyond the end of the bar, each arm having a shallow recess for engagement with said semi-spherical tip of said pin and having, at the other end, beyond said end of the bar, a pad normally facing the pad of the other finger, a coiled spring on each end portion of the rod, each spring bearing against the finger from outside to hold it in a yieldable, parallel abutment with the bar, said fingers being adapted to be spread apart against the tension of said springs, and each finger being also adapted to be swung upon said rod out of alinement with the opposite finger.

2. A pick-up device comprising a bar defined by two parallel, flat sides, a pair of fingers straddling said bar, one finger being pivotally mounted, midway its length, at the lower end of the bar and including an upper portion in longitudinal alinement with said bar, the other finger being similarly mounted and similarly disposed with respect to the bar on the other side thereof, means on the bar in a spaced relation to the pivotal mounting of the finger for a yielding engagement with the upper portion of the finger to hold it in a longitudinal alinement therewith, the lower portions of the fingers extending beyond the end of the bar, each finger including a pad facing a similar pad on the other finger, said pads being in a closely-spaced relation to each other and each being provided with a transverse recess the recesses facing each other for engagement with the stock to be picked up by the device on the movement of the device towards the stock at right angle to the length thereof, and spring means associated with the bar to hold the fingers yieldingly in abutment with the sides of the bar, each of the fingers being adapted to be swung about its pivotal connection out of longitudinal alinement with the bar and with the other finger, said fingers being adapted to be spread apart from each other against the tension of said spring means.

3. A pick-up device for lengths of stock, the device comprising a bar defined by two parallel flat sides, a pair of fingers straddling said bar, one finger being pivotally mounted midway its length at the lower end of the bar and including an upper portion in longitudinal alinement with said bar, the other finger being similarly mounted and similarly disposed with respect to the bar on the other side thereof, inter-engageable means upon the bar and the upper portion of each finger to yieldingly hold each finger in a longitudinal alinement with the bar, the lower portions of the fingers extending beyond the lower end of the bar, each finger being provided with a recess facing a similar recess on the other finger in a closely-spaced relation thereto, spring means to hold the fingers yieldingly in abutment with the sides of the bar, said fingers being adapted to be spread apart against the tension of said spring means by the stock on the movement of the fingers downwardly against the length thereof, each finger being adapted to be swung out of its longitudinal alinement with the bar by stock moving endwise against said finger.

4. A pick-up device comprising an oblong bar having one end secured to a supporting member, two fingers straddling the bar, each being pivotally connected, midway its length, to said bar and each including an upper portion and a lower portion extending beyond the other end of the bar, and each being provided with a pad, the pads facing each other and each having a recess therein, spring means to yieldingly hold the fingers in a closely-spaced opposed relation, inter-engageable means on the bar and the upper portion of each finger for co-operation with said spring means to hold the fingers in a longitudinal alinement with the bar, the fingers being adapted to be spread apart to grasp a length of stock on application of the fingers to the stock at right angle to the length thereof, each of the fingers being adapted to be pushed out of alinement with the bar by stock moving towards the recesses at right angle to the bar.

References Cited in the file of this patent

UNITED STATES PATENTS

| | | |
|---|---|---|
| 2,244,038 | Zapotosky | June 3, 1941 |
| 2,352,632 | Heyman | July 4, 1944 |